United States Patent [19]

Lauder et al.

[11] Patent Number: 4,548,312

[45] Date of Patent: Oct. 22, 1985

[54] APPARATUS FOR ORIENTATING ARTICLES

[75] Inventors: David R. Lauder, Timperley; Alan Bailey, Cheadle, both of England

[73] Assignee: British Nuclear Fuels plc, Warrington, England

[21] Appl. No.: 590,566

[22] Filed: Mar. 16, 1984

[30] Foreign Application Priority Data

Mar. 23, 1983 [GB] United Kingdom ............... 8307977

[51] Int. Cl.⁴ ............................................. B65G 47/24
[52] U.S. Cl. ..................................... 198/392; 198/394
[58] Field of Search ................ 198/382, 383, 390, 392, 198/394, 396, 399; 221/158, 167, 168, 171

[56] References Cited

U.S. PATENT DOCUMENTS 1,266,668  5/1918  Drew ................................ 198/399
2,277,940  3/1942  Wool ................................ 198/399
3,868,012  2/1975  Kinsley ............................ 198/399

Primary Examiner—Joseph E. Valenza
Assistant Examiner—Darrell G. Dayoan
Attorney, Agent, or Firm—William R. Hinds

[57] ABSTRACT

First and second chambers, each having a rotor are interconnected by a passage. The first chamber has a contoured periphery to receive articles and the passage is shaped and dimensioned to permit travel therealong only of those articles which are orientated in the first chamber with their longitudinal axes either in the direction of travel or normal to the direction of travel. Articles in other orientations are carried round the first chamber by the rotor for representation at the passage. The rotor in the second chamber permits the passage of those articles which have their longitudinal axes in the direction of travel and topples the articles having their axes normal to the direction of travel into positions in which the axes are in the direction of travel.

4 Claims, 9 Drawing Figures

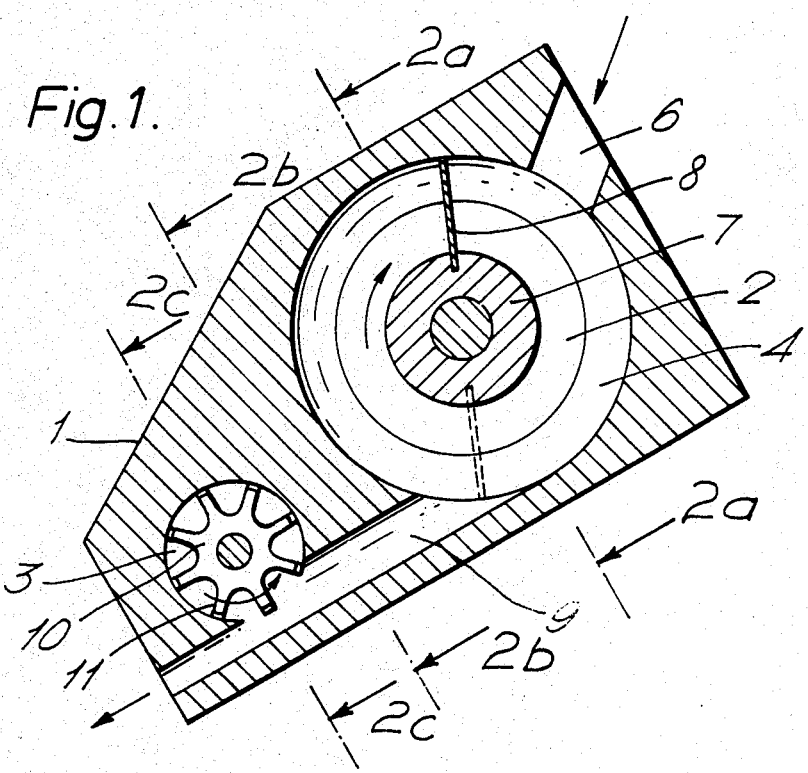
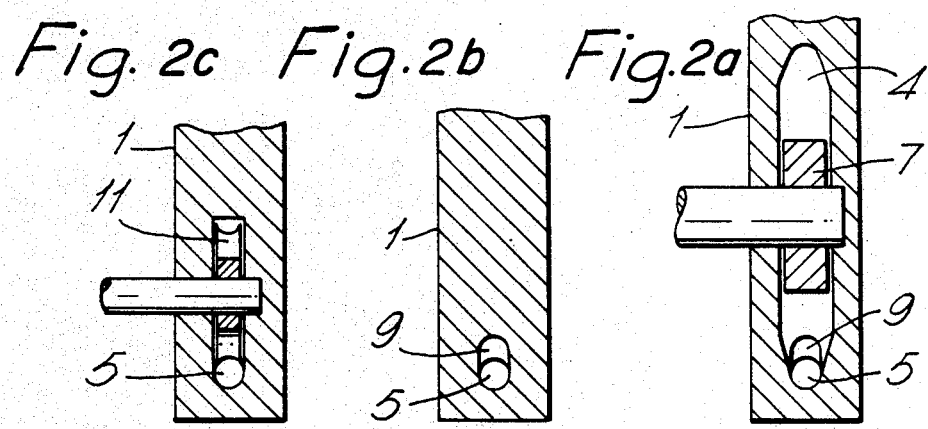

APPARATUS FOR ORIENTATING ARTICLES

The present invention concerns an apparatus for orientating cylindrical articles.

BACKGROUND OF THE INVENTION

An existing apparatus for orientating articles is a vibratory feeder, generally a vibratory bowl feeder. However, vibration and contact between articles in a vibratory feeder can result in damage to the articles.

FEATURES AND ASPECTS OF THE INVENTION

According to the present invention there is provided an apparatus for receiving randomly orientated substantially cylindrical articles and for arranging that the articles, on leaving the apparatus, are all orientated with their longitudinal axes in the direction of travel of the articles, the apparatus comprising a first chamber having a peripheral contoured channel dimensioned to receive the articles falling thereinto under gravity from an entry passage, a downwardly inclined outlet passage leading from the channel and dimensioned to permit passage of the articles therealong when the longitudinal axes of the articles are either in the direction of travel or normal thereto and to prevent the passage of articles therealong when the articles are in other orientations, a rotor within the first chamber operable to sweep the channel in the direction of travel of the articles to remove articles in said other orientations from the outlet passage and to convey such articles for representation at the outlet passage, the downwardly inclined outlet passage from the first chamber merging with a second chamber containing a further rotor rotatable in a direction opposed to the direction of travel of the articles along the outlet passage, the further rotor being dimensioned to permit the passage of articles disposed with their longitudinal axes in the direction of travel and to topple articles disposed with their longitudinal axes normal to the direction of travel into positions such that said axes lie in the direction of travel whereby all articles which enter the outlet passage exit therefrom with their longitudinal axes in the direction of travel.

DESCRIPTION OF THE DRAWINGS

The invention will be described further, by way of example, with reference to the accompanying drawings; in which:

FIG. 1 is a diagrammatic sectional elevation of an embodiment of the invention;

FIGS. 2a, 2b and 2c are respectively sections on 2a—2a, 2b—2b and 2c—2c in FIG. 1.

DESCRIPTION OF THE PREFERRED EMBODIMENT

Figure 3A:
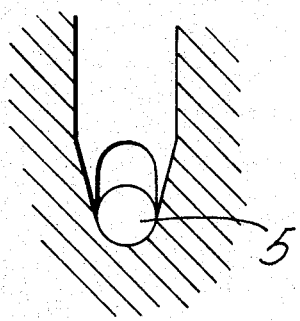
FIGS. 3a to 3e depict typical attitudes adopted by articles on dropping into the apparatus in FIG. 1.

The apparatus comprises a housing 1 having first and second circular chambers 2 and 3 respectively. The periphery of the chamber 2 is contoured to provide a channel 4 to receive cylindrical articles 5 falling into the chamber through an entry passage 6. A rotor 7 within the chamber 2 carries one or more flexible blades 8, the free end of the or each blade being shaped to match the shape of the channel 4.

A downwardly inclined outlet passage 9 leads from the chamber 2 to the chamber 3. A rotor 10 within the chamber 3 has a plurality of blades 11, the free end of each blade 11 traversing the passage 9 at its merger with the chamber 3. Preferably, the free ends of the blades 11 are radiused to a curvature corresponding to the curvature of the cylindrical articles 5 and as shown in FIG. 2c. The length of each blade 11 is such as to only permit the passage of an article when the latter is disposed with its longitudinal axis arranged in the direction of travel.

Figure 3B:
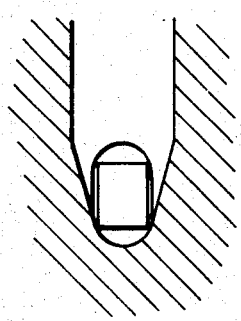
Figure 3C:
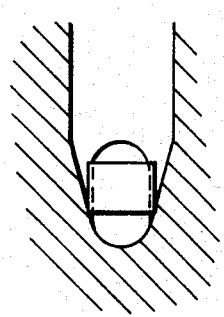
Figure 3D:
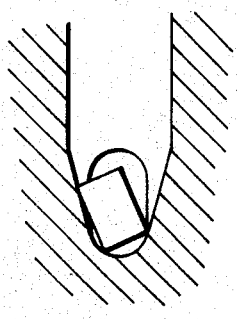
Figure 3E:
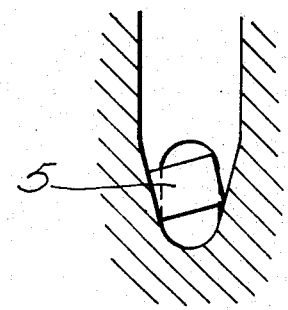

In operation, randomly orientated cylindrical articles enter the chamber 2 throught the passage 6 and fall into the contoured channel 4 in which the articles can adopt attitudes as depicted in FIGS. 3a to 3e. The attitudes in FIGS. 3b and 3d are unstable and usually the article will assume the attitude in FIG. 3a in which its longitudinal axis is in the direction of travel. In the attitudes in FIGS. 3c and 3e an article is not able to progress along the outlet passage 9. The outlet passage 9 is dimensioned to receive an article in the attitudes of FIGS. 3a and 3b.

With reference to FIG. 1, the rotor 7 rotates clockwise and the blade or one of the blades 8 engages behind an article which is not able to enter the outlet passage 9 and carries the article to the vicinity of the entry passage 6 so that the article can again drop into the contoured channel 4 for representation at the entrance to the passage 9.

Articles 5 which enter the passage 9 in an upright attitude as shown in FIG. 3b encounter the blades 11 of the rotor 10 which rotates in a direction counter to the direction of travel of the articles, that is counterclockwise in the embodiment shown in FIG. 1. The blades topple the article into the attitude shown in FIG. 3a. Thus articles emerging from the passage 9 are all disposed with their longitudinal axes in the direction of travel.

The rotors 7 and 10 can be driven from a common drive motor or can be provided with independent drive motors. A suitable speed of rotation can be about 20 revolutions per minute. The or each blade 8 can be formed from spring steel or can be in the form of a brush of steel wires.

The apparatus is adapted for orientating cylindrical or substantially cylindrical articles, the length of each article being generally not less than its diameter.

We claim:

1. An apparatus for receiving randomly orientated substantially cylindrical articles and for arranging that the articles, on leaving the apparatus, are all orientated with their longitudinal axes in the direction of travel of the articles, the apparatus comprising a housing, an entry passage in the housing, a first chamber having a peripheral contoured channel dimensioned to receive articles falling thereinto under gravity from the entry passage, a downwardly inclined outlet passage leading from the channel, said outlet passage being dimensioned to permit passage of articles therealong when the longitudinal axes of the articles are either in the direction of travel or normal thereto and to prevent the passage of articles therealong when the articles are in other orientations, a rotor within the first chamber operable to sweep the channel in the direction of travel of the articles to remove articles in said other orientations from the entrance of the outlet passage and to convey such articles for representation at the outlet passage, a second chamber within the housing, the outlet passage merging with the second chamber and a further rotor within the second chamber rotatable in a direction opposed to the direction of travel of the articles along the outlet passage, the further rotor being dimensioned to permit the passage of articles disposed with their longitudinal axes in the direction of travel and to topple articles disposed with their longitudinal axes normal to the direction of travel into positions such that said axes lie in the direction of travel whereby all articles which enter the outlet passage exit therefrom with their longitudinal axes in the direction of travel.

2. An apparatus according to claim 1 in which the rotor within the first chamber carries at least one blade.

3. An apparatus according to claim 1 in which the further rotor in the second chamber comprises a plurality of radial blades.

4. An apparatus according to claim 3 in which the free ends of said blades are radiused to a curvature corresponding to the curvature of the cylindrical articles.